US009268159B2

(12) United States Patent
Rogers et al.

(10) Patent No.: US 9,268,159 B2
(45) Date of Patent: Feb. 23, 2016

(54) LOW FOCAL SHIFT KW CLASS OPTICAL ISOLATOR

(71) Applicant: Electro-Optics Technology, Inc., Traverse City, MI (US)

(72) Inventors: Evan M. Rogers, Traverse City, MI (US); Amir A. Jalali, Traverse City, MI (US); David G. Scerbak, Traverse City, MI (US)

(73) Assignee: Electro-Optics Technology, Inc., Traverse City, MI (US)

( * ) Notice: Subject to any disclaimer, the term of this patent is extended or adjusted under 35 U.S.C. 154(b) by 144 days.

(21) Appl. No.: 14/094,204

(22) Filed: Dec. 2, 2013

(65) Prior Publication Data
US 2014/0160565 A1 Jun. 12, 2014

Related U.S. Application Data

(60) Provisional application No. 61/735,421, filed on Dec. 10, 2012, provisional application No. 61/736,733, filed on Dec. 13, 2012.

(51) Int. Cl.
G02F 1/09 (2006.01)
G02B 27/28 (2006.01)
G02B 6/42 (2006.01)

(52) U.S. Cl.
CPC ............. *G02F 1/093* (2013.01); *G02B 6/4208* (2013.01); *G02B 6/4296* (2013.01)

(58) Field of Classification Search
CPC ...... G02F 1/093; G02B 6/4208; G02B 6/4296
USPC .................... 359/484.03; 385/11, 31
See application file for complete search history.

(56) References Cited

U.S. PATENT DOCUMENTS

| 4,927,226 | A   | * | 5/1990  | Ortiz, Jr. .................. 398/156 |
| 6,246,807 | B1  |   | 6/2001  | Lu et al. |
| 6,430,323 | B1  |   | 8/2002  | Kokkelink |
| 7,306,376 | B2  | * | 12/2007 | Scerbak et al. ............ 385/76 |
| 7,426,325 | B2  | * | 9/2008  | Scerbak et al. ............ 385/31 |
| 8,743,458 | B2  | * | 6/2014  | Nicklaus et al. .......... 359/484.03 |
| 2002/0154666 | A1 | * | 10/2002 | Vail et al. ................ 372/50 |
| 2003/0147136 | A1 |   | 8/2003  | Pan et al. |
| 2007/0280620 | A1 | * | 12/2007 | Matsuda et al. ........... 385/137 |
| 2008/0165418 | A1 | * | 7/2008  | Scerbak et al. ........... 359/484 |
| 2008/0298739 | A1 | * | 12/2008 | Chang et al. ............. 385/11 |
| 2011/0069387 | A1 |   | 3/2011  | Iida |
| 2012/0194906 | A1 | * | 8/2012  | Nicklaus et al. ......... 359/484.03 |

FOREIGN PATENT DOCUMENTS

EP        0 492 437 A1   7/1992

OTHER PUBLICATIONS

Snetkov et al., "Compensation of thermal effects in Faraday isolator for high average power lasers" Applied Physics B; Laser and Optics Springer Berlin, DE vol. 109, No. 2, (Sep. 21, 2012), pp. 239-247.

(Continued)

*Primary Examiner* — Frank Font
(74) *Attorney, Agent, or Firm* — Kilpatrick Townsend & Stockton LLP; Kenneth R. Allen

(57) ABSTRACT

A kW Class optical isolator employs negative feedback to yield low focal shift over dynamically changing power levels. The isolator is useful as a kW fiber laser output isolator.

15 Claims, 10 Drawing Sheets

(56) References Cited

OTHER PUBLICATIONS

Zelenogorsky et al., "Adaptive compensation of thermally induced aberrations in Faraday isolator by means of DKDP crystal" Proceedings of SPIE, vol. 5975, (Feb. 15, 2006), pp. 597501-597508.

Buhrer C F, "Wideband Temperature-Compensated Optical Isolator or Circulator Configuration Using Two Faraday Elements" Optics Letters, Optical Society of America, US, vol. 14, No. 21, (Nov. 1, 1989), pp. 1180-1182.

Mueller et al., "Method for compensation of thermally induced modal distortions in the input optical components of gravitational wave interferometers" Classical and Quantum Gravity, vol. 19, No. 7, (Apr. 7, 2002), pp. 1793-1801.

Extended European Search Report for European Application No. 13196348.0 mailed Jun. 30, 2014, 19 pages.

Khazanov et al., "Elimination of thermally induced modal distortions in Faraday isolators for high power laser systems" Lasers and Electro-Optics, (2004) XP032016275, ISBN: 978-1-55752-777-6.

Efim A. Khazanov "Investigation of Faraday isolator and Faraday mirror designs for multi-kilowatt power lasers" Proceedings of SPIE, vol. 4968, (Jan. 1, 2003) pp. 115-126. XP055035792, ISSN: 0277-786X, DOI: 10.1117/12.478319.

Akinaga H et al., "Magneto-optical properties and the potential application of GaAs with magnetic MnAs nanoclusters" Applied Physics Letters, American Institute of Physics, US vol. 76, No. 1 (Jan. 3, 2000) pp. 97-99.

Kolja Nicklaus et al., "Faraday isolators for high average power fundamental mode radiation" Proceedings of SPIE, vol. 7578, (Feb. 11, 2010) p. 75781U, XP055103127 ISSN: 0277-786X DOI: 10.1117/12.842121.

Inon Moshe et al., "Dynamic correction of thermal lensing and birefringence in high-power solid-state lasers" XIII International Symposium on Gas Flow and Chemical Lasers and High-Power Laser Conference (Sep. 18, 2002) pp. 435-438, XP055103296.

Partial European Search Report for European Application No. 13196348.0 mailed Mar. 3, 2014, 7 pages.

* cited by examiner

LOW FOCAL SHIFT KW CLASS OPTICAL ISOLATOR

CROSS-REFERENCES TO RELATED APPLICATIONS

This application claims benefit under 35 U.S.C. §119e to application Ser. No. 61/735,421 filed Dec. 10, 2012 and Ser. No. 61/736,733 filed Dec. 13, 2012. In addition to patent applications from which priority is claimed, the present application incorporates by reference U.S. patent application Ser. No. 13/673,755 filed Nov. 9, 2012.

STATEMENT AS TO RIGHTS TO INVENTIONS MADE UNDER FEDERALLY SPONSORED RESEARCH AND DEVELOPMENT

Not applicable

REFERENCE TO A "SEQUENCE LISTING," A TABLE, OR A COMPUTER PROGRAM LISTING APPENDIX SUBMITTED ON A COMPACT DISK

Not applicable.

BACKGROUND OF THE INVENTION

This invention relates generally to optical isolators for use with lasers at power levels up to and in excess of 1 kW.

High power optical isolators have been long sought for use with industrial metal working lasers to protect them from deleterious reflections. Highly reflective molten metal pools produced by these lasers can couple reflected light back into laser sources. This coupling can be highly efficient even at non-normal incidence angles. These reflections can cause the laser to run unstable or, in extreme cases, irreparably damage the laser itself. This is especially true for recently available, highly efficient, high gain, kW class fiber lasers. Similar concerns can be expected for high brightness direct diode arrays that have been demonstrated to have sufficient power to initiate "key-hole" deep penetration welds in metals [R. K. Huang, B. Chann, J. D. Glenn "Ultra-high brightness, wavelength-stabilized, kW-class fiber coupled diode laser", website technical paper at www.teradiode.com (January/2013), also available from TeraDiode Inc., 11A Beaver Brook Road, Littleton, Mass. 01460]. For these reasons optical isolators suitable for use with high power lasers are considered an enabling technology for many emerging industrial and defense applications.

As an example, due to their very high brightness and invariant beam parameters, fiber lasers have shown great promise to become the efficient high power laser sources required for viable Laser Additive Machining ["LAM"] systems. In LAM, a 3D metal part is built up by using a tightly focused high power laser to sinter fine metal particles together. The potential to make small quantities of prototype or replacement parts directly with a remotely located laser system out of a canister of metal powder and using a 3D computer model of the part has important implications for future manufacturing. The minimum feature size of the resulting metal part is directly related to how tightly the laser can be focused—which can be as small as tens of microns for high brightness fiber lasers. Further, it is beneficial to be able to continuously vary the power of the laser source over its complete range. Very high power is used to build up solid interior regions of the part quickly or to make large features and high tolerance surfaces rapidly, while lower power is used to make very fine features of small dimension. However, as noted above, the reflective nature of the materials used, coupled with the high sensitivity of fiber lasers to optical reflections, has made optical isolators essential to further development of these potential fiber laser LAM and other markets.

Typical optical isolators comprised a Faraday rotator to provide 45° of polarization rotation surrounded by polarizers that have their transmission axis rotated 45° relative to each other. Faraday rotation serves to rotate the polarization from a first polarizer onto the transmission axis of a second polarizer on the opposite end of the Faraday rotator in the transmission direction. Because Faraday rotation is non-reciprocal (the sense of rotation is the same for beams propagating through the Faraday rotator in either direction) backward propagating radiation transmitted through the second polarizer and the Faraday rotator towards the laser source is orthogonally polarized to the first polarizer and thereby rejected.

At wavelength $\lambda$ and temperature T the angle of polarization rotation, $\theta$, in a Faraday rotator is given by $\theta(\lambda,T)=V(\lambda,T) \cdot L \cdot H(T)$ where $H(T)$ is the magnetic field in the direction of beam propagation, L is the length of the Faraday optic in this direction and $V(\lambda,T)$ is the Verdet constant of the Faraday optic.

To date, optical isolators suitable for use with high power lasers have suffered from thermal effects within the isolator optical elements. Intrinsic absorption of laser radiation transmitted through bulk optical elements and coatings within an optical isolator causes a thermal gradient to occur across the beam spatial profile. Faraday rotator materials typically have a higher absorption coefficient than any other element within an optical isolator, hence the thermal gradient and resultant thermal effects are highest within the Faraday rotator. Because the Verdet constant $V(\lambda,T)$ is a function of temperature, this thermal gradient will cause the polarization rotation $\theta(\lambda,T)$ to vary across the beam profile. This thermal profile is responsible for two additional deleterious thermal effects: thermal lensing and thermal birefringence.

Depending upon the specific requirements of a given application, thermal lensing in optical isolators can be of a concern with as little as 20 W of average optical power. Thermal lensing primarily results from a change in material refractive index with temperature [dn/dT] that is present within optical components. Stress birefringence and end effects also contribute to the thermal lens, however, since their contribution is small they are usually ignored.

The focal length of a thermal lens in a Faraday rotator scales as the square of beam radius. For this reason, past attempts to reduce the focal length of the thermal lens have used large beams in very large and expensive Faraday rotators. However, because thermal lensing does vary the beam parameters of a laser beam, it is most importantly, and practically, observed as a shift in the focal position of the optical system, $\Delta Z_{TL}$, which focuses the laser beam. When expressed relative to the Rayleigh range $z_R$ of the focused spot, the relative thermal lens focal shift $\Delta Z_{TL}/Z_R$, has been stated to be independent of beam diameter for a given Faraday rotator material and linearly dependent upon average optical power [K. Nicklaus and T. Langer, "Faraday isolators for high average power fundamental mode radiation", *Proc. of SPIE* Vol. 7578, (2010)]. For average power P in kW, and focused spot Rayleigh range $Z_R$, the relative thermal lens focal shift for a diffraction limited beam is:

$$\Delta Z_{TL}/Z_R = ALP \qquad \text{Eqn. 1}$$

For a fixed wavelength. A in Eqn. 1 is a constant that has units of $cm^{-1} kW^{-1}$ and is derived from measurable constants such as the thermo-optical coefficient (dn/dT), absorption coefficient and thermal conductivity. The length L of the optical material is expressed in cm.

The Rayleigh range $Z_R$ associated with a given waist radius $\omega_o$ at wavelength $\lambda$ is:

$$Z_R = \frac{\pi \omega_o^2}{\lambda} \qquad \text{Eqn. 2}$$

Assuming relative focal shifts $\Delta Z_{TL}/Z_R$ that are small relative to the focal length of a final focusing lens, it is straightforward to approximate how the focused beam radius $\omega(\Delta Z_{TL})$ will increase at higher power, P, from a starting condition where the low power waist $\omega_o$ is in the focal plane of the final focusing lens:

$$\omega(\Delta Z_{TL}) = \omega_o \left[ 1 + \left(\frac{\Delta Z_{TL}}{Z_R}\right)^2 \right]^{1/2} \qquad \text{Eqn. 3}$$

For a common high power Faraday rotator material such as terbium gallium garnet ["TGG"], the characteristic constant is typically found to be A=3.5 cm$^{-1}$ kW$^{-1}$ at 1060 nm when a TGG crystal is of high quality with absorption coefficient:

$$\alpha = 0.0015 \text{ cm}^{-1}.$$

For a beam of any diameter and power P (in kW) at 1060 nm, the relative focal shift is therefore $\Delta Z_{TL}/Z_R = 7P$ when using 2 cm of high quality TGG with a diffraction limited beam. For an application such as LAM where it is necessary to have a very tight focus at low power, but where it is also important to vary the laser power rapidly, the effects of thermal lensing can be readily seen to be very important. For example, for a diffraction limited 1/e$^2$ collimated 1060 nm laser beam diameter of 10 mm into a final focusing lens of 500 mm focal length, the low power focused beam radius, $\omega_o$, according to diffractive theory will be 33.7 µm with a corresponding Rayleigh range $z_R$=3.37 mm. In this case if the final focusing lens is positioned to focus the laser beam tightly at low power for sintering small, fine features, according to Eqns 2 & 3 the beam diameter at a power P=1 kW will be:

$$\omega(\Delta Z_{TL}) = 33.7 \text{ µm} \left[ 1 + \left(\frac{7 Z_R}{Z_R}\right)^2 \right]^{1/2}$$
$$= 238 \text{ µm}$$

Such large differences in focused beam radius can manifest themselves as visually noticeable changes in the feature size as well as measurable dimensional shifts in LAM fabricated parts.

Although a larger beam size due to such focal shift may be suitable for building up bulk interior sections of a part, it will be unable to sinter fine features and accurate surfaces quickly at high power. Hence, such large thermal lens focal shifts will generally require the power to be kept very low for all fine features and accurate surfaces, making the time to build a typical part impractically long. This is just one example of the numerous ways thermal focal shift due to thermal lensing in optical isolators can be unsuitable for industrial application. An optical isolator having low focal shifts due to thermal lensing at high power is therefore desired.

The other detrimental thermal effect occurring in high power isolators noted previously is thermal birefringence. The thermal gradient across the beam profile due to absorption leads to thermal strains in the isolator optical components at high power.

These thermal strains cause linear birefringence via the photoelastic effect. This thermal birefringence becomes the limiting factor determining the isolation ratio, and consequently the effectiveness, of an optical isolator at high power. Thermal birefringence scales with the square of each of the following incident parameters: incident power level P, Faraday optic length L and absorption coefficient $\alpha$. Unlike thermal lensing, thermal birefringence is independent of beam size. For a TGG rod length of 1.6 cm and absorption coefficient of $\alpha$=0.0015 cm$^{-1}$, it has been shown that thermal birefringence will limit isolation to less than 25 dB with less than 200 W [K. Nicklaus and T. Langer, "Faraday isolators for high average power fundamental mode radiation", *Proc of SPIE*, Vol. 7578, (2010)]. At increasing power levels isolation drops rapidly unless thermal birefringence is addressed in the optical isolator. A passive means of effectively compensating thermal birefringence with isolation greater than 25 dB for power levels well in excess of 1 kW has been described [E. A. Khazanov, "Compensation of thermally induced polarization distortions in Faraday isolators", *Quantum Electronics* 29 (1) 59-64 (1999)]. In this method a 67.5° reciprocal quartz polarization rotator is preferentially used between a pair of identical 22.5° non-reciprocal Faraday rotators such that a linear polarization entering the first Faraday rotator is flipped by 90° upon entering the second Faraday rotator. This polarization flipping substantially cancels linear birefringence via the photoelastic effect from thermal strains in each Faraday rotator. A half-waveplate may replace the 67.5° quartz rotator to achieve the same effect, albeit with reduced birefringence compensation performance at high power. However, due to the strong wavelength dependence of the desired 22.5° Faraday rotation angle in the method above, this birefringence compensation method alone does not achieve high levels of isolation over broad wavelength ranges typical of the gain bandwidth of common high power fiber lasers (as much as 200 nm including Raman gain) or high power fiber coupled laser diode arrays using spectral beam combining.

A method for achieving high power broadband optical isolation is described in detail in U.S. patent application Ser. No. 13/673,755 filed Nov. 9, 2012, owned by the assignee of the present invention. The content of this patent application is incorporated herein by reference for all purposes. The method described therein uses an additional 112.5° quartz rotator of opposite rotation sense to that of the 67.5° quartz rotator at the center wavelength of operation $\lambda_c$. The 112.5° quartz rotator is located between either the input or the output broadband polarizer and the respective adjacent 22.5° Faraday rotator in the above thermal birefringence compensation scheme to simultaneously passively compensate the wavelength dependence of Faraday rotation and thermal birefringence at high power.

Alternative techniques to improve the high power capability of optical isolators exist and have been discussed. A first method for reducing thermal lensing and/or thermal birefringence is to use improved Faraday optic materials. Terbium aluminum garnet ("TAG") in crystalline or transparent ceramic form offers potential advantages as a Faraday rotator material over TGG in the visible and near infrared spectral region. At 1 µm, the Verdet constant of TAG is 30% greater than TGG as well as optical absorption similar to TGG and improved thermo-optical properties [M. Geho, T. Sekijima and T. Fujii, "Growth of terbium aluminum garnet ($Tb_3Al_5O_{12}$; TAG) single crystals by the hybrid laser floating zone machine", *J. Crystal Growth*, V. 267, 188-193, (2004)]. Permutations of TAG, such as TSAG (where some scandium is substituted for terbium) and TSLuAG (where scandium and lutetium are substituted for terbium) in order to improve crystal growth and yield with only a minimal reduction in TAG Verdet constant have also been described in the literature [Encarnación G. Villora, "Faraday rotator properties of $\{Tb_3\}$ $[SC_{1.95}Lu_{0.05}](Al_3)O_{12}$, a highly transparent terbium-garnet for visible-infrared optical isolators" *Applied Physics Letters* 99, 01111 (2011)]. However, the Verdet constant and thermo-optic improvements that these materials offer relative to TGG are incremental. These materials may reduce thermal lens focal shifts below that of TGG by a factor of approximately two. Such a reduction in thermal lens focal shift is insufficient to make low thermal lens focal shift, kW class optical isolators of simple construction similar to presently available lower power TGG optical isolators. Further, new Faraday rotator materials such as TAG in crystalline or transparent ceramic form are difficult and expensive to bring to the market. To date, TGG remains presently the most proven, broadly available high power Faraday rotator material for the visible and near infrared spectral region.

For conventional circularly symmetric laser beams, optical isolators typically use rod shaped Faraday rotator optical elements. In a quest to reduce thermal gradients across a beam, other Faraday rotator optical element geometries have been proposed. The most studied of these have been slab geometries and segmented discs with liquid cooled optical faces [E. A. Khazanov, "Investigation of Faraday isolator and Faraday mirror designs for multi-kilowatt power lasers," in *Solid State Lasers XII*, R. Scheps, ed., Proc. SPIE 4968, 115-126 (2003)]. In slab geometries a highly elliptical laser beam is transmitted through slab shaped Faraday rotator optical elements having a high aspect ratio (width:thickness≥15) rectangular aperture. By removing heat only from the two large non-optical surfaces of the slab while thermally insulating the other two small non-optical edges, a temperature gradient across the beam in the thin slab dimension only is produced. This thermal gradient along one axis is substantially reduced with high aspect ratio slabs compared to that of a conventional rod shaped Faraday rotator with circular beams. Although reduced in magnitude, a cylindrical thermal lens is formed which can be more difficult to focus properly in an optical system. Additionally, either expensive cylindrical lens systems that are subject to additional thermal lens considerations, or complicated off axis spherical mirror systems prone to aberration at the desired high aspect ratios are required to first convert conventional circular beams to a highly elliptical beam and then back to a circular beam as desired by conventional laser use. Slab geometry Faraday isolators offer some utility when used with slab geometry solid state laser systems that already employ elliptical beams or with linear arrays of circular beams. However, the factors noted above have kept slab geometries from being broadly employed with conventional circular beam high power laser sources.

Another method to reduce thermal gradients within Faraday rotators is that of segmented disc Faraday rotator optical elements where heat is removed through the optical faces by flowing cooling gasses over them. In theory, thermal gradients occur primarily in the direction of beam propagation [E. A. Khazanov, "Investigation of Faraday isolator and Faraday mirror designs for multi-kilowatt power lasers," in *Solid State Lasers XII*, R. Scheps, ed., Proc. SPIE 4968, 115-126 (2003)]. This greatly reduces the thermal gradient across the beam profile responsible for thermal lensing and birefringence. Due to the cost and complexity of multiple optical elements and coolant systems required, such designs have not been employed beyond research lab environments to date and do not appear destined for practical industrial usage.

The thermal gradient across the beam radius together with a positive dn/dT results in a positive thermal lens in currently used Faraday rotator optical materials. For this reason, some researchers have explored the use of negative dn/dT optical materials (such as Schott FK51 optical glass or DKDP crystals) to compensate thermal lensing in Faraday rotators [E. Khazanov et. al., "Compensation of Thermally Induced Modal Distortions in Faraday Isolators", *IEEE J. Quantum Electron.* 40, 1500-1510 (2004)]. However this approach has been found to have some major drawbacks. First, these materials have different thermal conductivity, heat capacity and absorption coefficients, rendering thermal lensing compensation difficult to achieve with dynamic changes in laser power. Second, negative dn/dT materials typically have strong thermal birefringence, such that the resultant poor extinction defeats the original purpose of the optical isolator. Finally, most negative dn/dT materials studied to date have undesirable material properties such as low resistance to thermal shock and/or sensitivity to humid environments. To date, negative dn/dT materials to compensate thermal tensing have not found usage in industrial environments.

Active compensation can be considered as a viable means for reducing the effects of thermal lensing in optical isolators. However, a compact, robust, inexpensive means for accurately sensing thermal lens focal length shifts to feedback into an active thermal lens compensation system is a difficult design task. Additionally, the need for sub-Hz response times for rapid power changes while simultaneously precisely maintaining the original beam path is challenging, bulky and costly although future innovation may address these issues.

All-fiber isolators may have the potential to resolve the thermal issues noted above for high power optical isolators. Like fiber lasers, all-fiber isolators should, in principle, have beam parameters defined by the fiber waveguide characteristics. As a consequence, thermal lensing would not be expected from all-fiber isolators if the Faraday fiber and polarizing fiber which are fusion spliced together in such devices can be made to handle high power. Recently, all-fiber optical isolators of small size using short terbium glass based fiber have become available commercially for power levels up to 5 W only (AdValue Photonics Inc., 3708 E. Columbia Street, Suite 100, Tucson, Ariz. 85714. Model #AP-AFI-1060PM). Some work has been done to try to incorporate the small Faraday rotation present in low loss silica fiber into practical all-fiber optical isolators (Gerald T. Moore, "In-fiber optical isolator for high-power operation", U.S. Pat. No. 7,336,858, Feb. 26, 2008). These research efforts however have been plagued by very large, heavy and expensive magnet structures that do not seem suitable for widespread commercial use. It remains to be seen if high rotation Faraday fiber can be made with low enough loss to support high power operation without damage with average power levels on the order 1 kW difficult to see in the foreseeable future. The effects of thermal birefringence in all-fiber optical isolators are difficult to assess presently, and represent an additional uncertainty at this point in time regarding the potential for high power operation of all-fiber isolators.

Although active thermal lens compensation or all-fiber optical isolators may prove viable in the future, a simple, low cost, completely passive means for minimizing focal shifts in high power optical isolators subject to rapid changes in power is desired.

SUMMARY

According to the invention, in an optical isolator, specific optical beam waist locations are used in conjunction with diffraction due to relatively small beam diameters in order to dynamically compensate for focal shifts within the optical isolator such that the axial position of the final beam waist in transmission is substantially unchanged over the full power range of a high-power, i.e., kW class laser. In a specific embodiment, the final waist location is also substantially constant in radius, ensuring that a focused waist after the optical isolator will remain practically constant with respect to position and size when varying the laser source power over its power range.

The invention is applicable at any wavelength transmitted by Faraday rotator material. Terbium gallium garnet (TGG) is the preferred material for visible and near infrared wavelengths and is the material typically used in the prior art. The invention will be explained with reference to TGG. Alternative materials for the visible and near infrared region include, but are not limited to, TAG, TSAG, and TSLuAG. As an example, Gallium Arsenide (GaAs) may be used as the Faraday rotator material in the 2 µm region. Due to different material properties, exact details, such as beam parameters, physical dimensions and optical performance will vary slightly.

In a specific embodiment of the invention, two 22.5° Faraday rotators are used within an optical isolator separated by a reciprocal optical rotator to compensate thermal birefringence at high power. A beam of optimized radius (near 0.3 mm) from a fiber pigtailed collimator acting as a beam radius selector is made to converge through a first Faraday rotator and have a low power waist axial location within a second Faraday rotator and beam radius near 150 µm. As power increases, causing thermal lensing in the first Faraday rotator, the waist in the second Faraday rotator will normally reduce in size and start to shift towards the first Faraday rotator. Focal shifts in the second Faraday rotator will begin to go negative, driving the waist location of the output beam back to its original position. Hence an entirely passive closed negative feedback loop is formed within the optical isolator. This feedback loop is capable of substantially eliminating focal shifts out of the isolator over a very broad range of operating power and is robust with respect to practical changes in material absorption and/or small variations in input beam size. Many high power fiber coupled sources have broad gain bandwidths and/or operate over broad wavelength ranges, such as Yb fiber lasers and high power spectrally beam combined laser diode arrays. For this reason a second optical rotator to provide high power broadband isolation in accordance with U.S. patent application Ser. No. 13/673,755 is included in the preferred embodiment of the invention shown in FIG. 3 as herein after explained. Furthermore, more than two Faraday rotators can be used.

Another aspect of the invention is that the optic diameter of the Faraday rotator optical element is large relative to the diameter of the incident beam. The edges of the rod forming the Faraday rotator, which due to the typically higher thermal conductivity of the mounting are effectively held at a constant temperature, alter the thermal profile as the beam diameter is reduced. A theoretically infinite optic diameter creates a thermal profile which makes an ideal lens. As the optic diameter is reduced relative to beam size, spherical aberration increases, causing degradation in beam quality.

In accordance with another aspect of the invention, focal shifts due to thermal lensing can be compensated in one or both orthogonal planes of an incident beam cross section. This aspect of the invention allows slab geometry-type Faraday rotators to be used with linear arrays of circular beams using compact and efficient magnet structures or with highly elliptical beams to reduce thermal birefringence. This aspect of the invention is particularly suited for isolating the individual outputs of many high fiber lasers prior to combining their outputs for power scaling with various beam combination schemes.

The maintenance of final waist location in transmission makes devices built in accordance with the invention particularly useful as output devices with fiber lasers such that their highly stable beam parameters are preserved. In addition, the invention can be readily used with polarization maintaining [PM] and polarization insensitive [PI] configurations. Further application of the invention is for optical isolators fiber pigtailed at the input and output. In these applications, the substantial elimination of focal shifts within the Faraday effect device enables kW class fiber to fiber operation with useable fiber to fiber coupling efficiency.

As an alternative embodiment of the invention, a similar negative feedback loop can be generated using a single 45° Faraday rotator and an additional optical component which produces a similar thermal lens in place of the two 22.5° Faraday rotators. This additional optical element can be the same Faraday material without an interacting magnetic field, or it can be another material with similar absorption and thermal properties. This optical element can be placed either between the polarizers used in the isolator or outside of them.

The invention substantially eliminates focal shifts due to thermal lensing by a completely passive method. Thermal birefringence is also compensated, enabling high isolation at power levels beyond 1 kW. Devices according to the invention can be used with any type of laser, and with rapidly changing power levels. Because a device made according to the invention maintains the highly desirable constant beam parameters inherent to fiber lasers and fiber coupled high brightness direct diode arrays, such a device is particularly well suited for use with high power forms of these lasers.

The invention will be better understood by reference to the following detailed description in connection with the accompanying drawings.

DETAILED DESCRIPTION OF THE INVENTION

Figure 1:
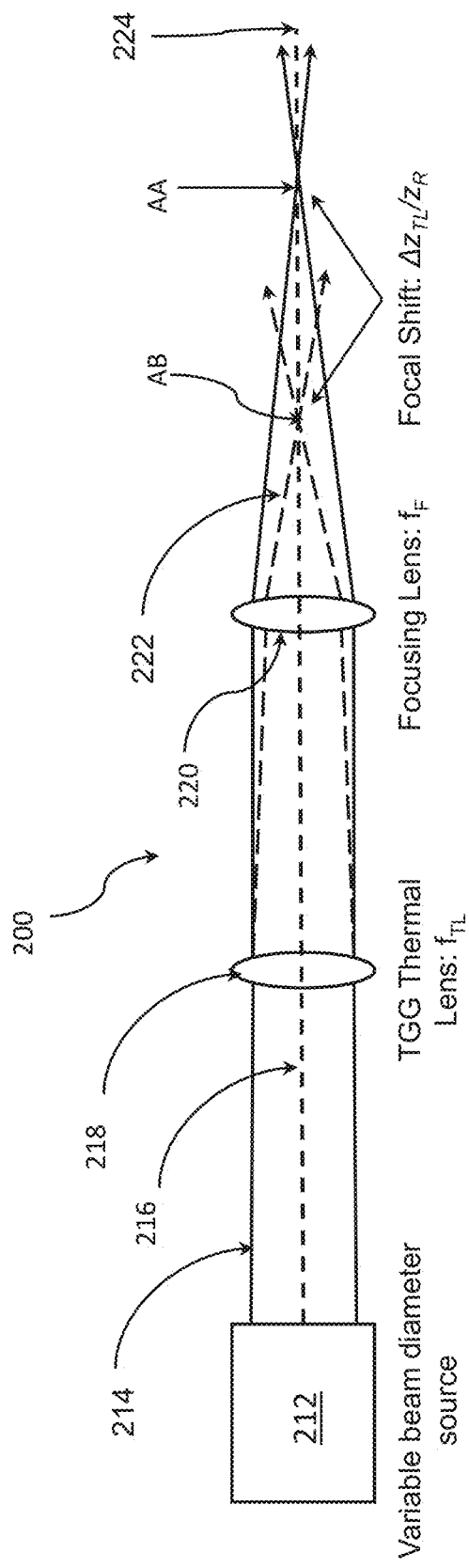
FIG. 1 is a schematic representation of an optical system with focal shifts due to thermal lensing.

The invention can best be understood by considering focal shifts due to thermal tensing versus incident power when varying the collimated beam radius at the thermal lens. FIG. 1 illustrates an optical system 200 (prior art) modeled using the ABCD matrix method and Gaussian beams. A beam source 212 produces an optical beam 214 of variable diameter that has a central axis 216. The beam 214 is directed on a path along the central axis 216 through a thermal lens 218, such as formed of terbium gallium garnet (TGG), and a focusing lens 220, with a resultant high power ray path 222 and low power ray path 224 characterized by a focal shift from Point AA to Point AB along the central axis 214 upon increased power (with resultant heating effects).

Figure 2:
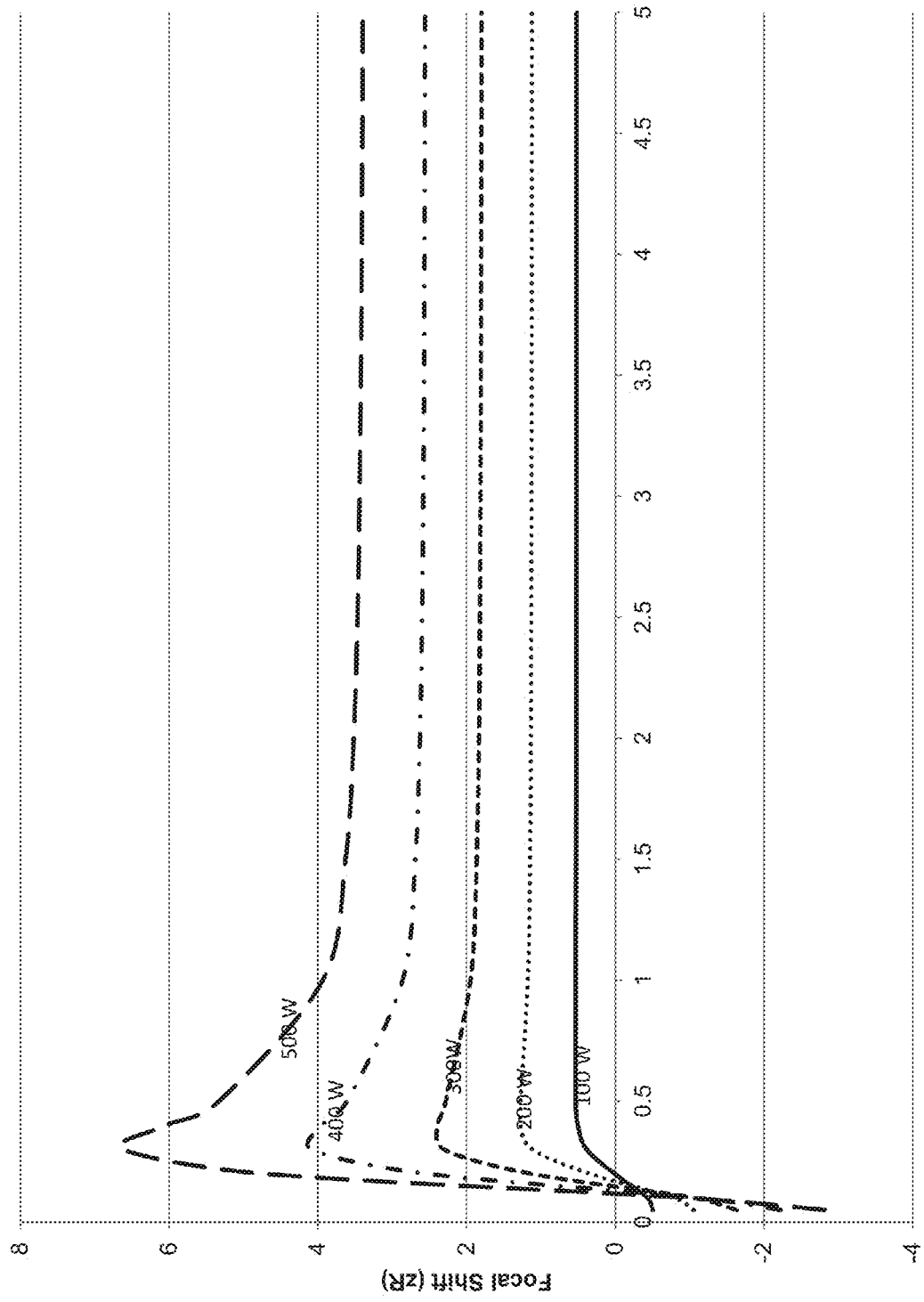
FIG. 2 is a graph showing plots of focal shift versus incident beam radius for various power levels where focal shift is expressed in terms of number of Rayleigh ranges of the focused beam.

The TGG thermal lens 18 can be modeled after the methods routinely used for solid-state lasers using known values typical for TGG. The resulting thermal lens focal length as a function of power is then modeled as a paraxial thin lens in an ABCD matrix analysis of FIG. 1. [Innocenzi et. al. "Thermal modeling of continuous-wave end-pumped solid-state lasers", *Appl. Phys. Lett.* 56 (19), 1990 1831-1833.] The resulting focal shifts are then expressed relative to a Rayleigh range $Z_R$ of the focused spot with no thermal lens present. The results, shown in FIG. 2, confirm the previously reported result of essentially constant relative focal shift $\Delta Z_{TL}/Z_R$ for larger beams with varying beam radius. According to the invention, the relative thermal lens focal shift, $\Delta Z_{TL}/Z_R$, for beams less than 0.3 mm radius is not substantially constant as it is for larger diameter beams. This behavior is shown in FIG. 2 based upon the experimental setup shown in FIG. 1. Due to diffraction, it can in fact be greater than or less than the nominally constant focal shift experienced by larger diameter beams and can even become negative. At 500 W and above, a beam near 0.3 mm radius is seen to be nearly double the focal shift of much larger beams. Further, due to diffraction, this focal shift reduces sharply with decreased beam size and goes negative for beam radii below 150 µm. The present invention uses the strong slope of focal shift versus beam radius below 0.3 mm (Region S shown in FIG. 2) to dynamically compensate focal shift due to thermal lensing within a self-stabilizing optical system created by the optics in Faraday effect devices. The material of interest is TGG.

Referring to FIG. 2, it is observed that, depending upon incident power levels of about 200 W up to 500 W as shown, the relative thermal lens focal shift $\Delta Z_{TL}/Z_R$ is essentially zero for beam radii of approximately 0.15 mm (Point AC). In accordance with one embodiment of the invention, if the beam is constrained to nominally the zero focal shift point for the selected material (0.15 mm for TGG) and maintain at this beam size throughout the material forming a single 45° Faraday rotator, focal shifts due to thermal tensing will be negligible. In this embodiment, the low power waist of approximately 0.15 mm is positioned within the Faraday rotation optical element. With a corresponding Rayleigh range of about 60 mm and ideally a TGG length≤16 mm, the beam size throughout the optic is nearly constant. Although it is true that the results shown in FIG. 2 can give low focal shift under tightly controlled conditions for a single Faraday rotator, such operation is not sufficiently robust for commercial application with high power lasers. Small differences in parameters such as TGG absorption coefficient, actual beam radius, and/or waist location, such as may commonly occur in production, together with other variables such as back reflected power, can change the position of the steep slope of these curves enough to produce difficult-to-reproduce or unstable results. Further, for power levels≥200 W and beyond, isolation will benefit from a mechanism for reducing thermal birefringence. The most effective mechanism for achieving this to date has been through the use of two 22.5° Faraday rotators separated by a reciprocal optical rotator.

In one embodiment of the invention, a more robust, passive, negative feedback optical system that maintains low focal shift even in the presence of high back-reflections can be constructed using two (or more) Faraday rotators. In order to reduce parts count and complexity, two 22.5° Faraday rotators and two optical rotators may be used to enable high power broadband performance. A schematic drawing of such an embodiment in the form of a PI optical isolator is shown in FIG. 3.

Figure 3:
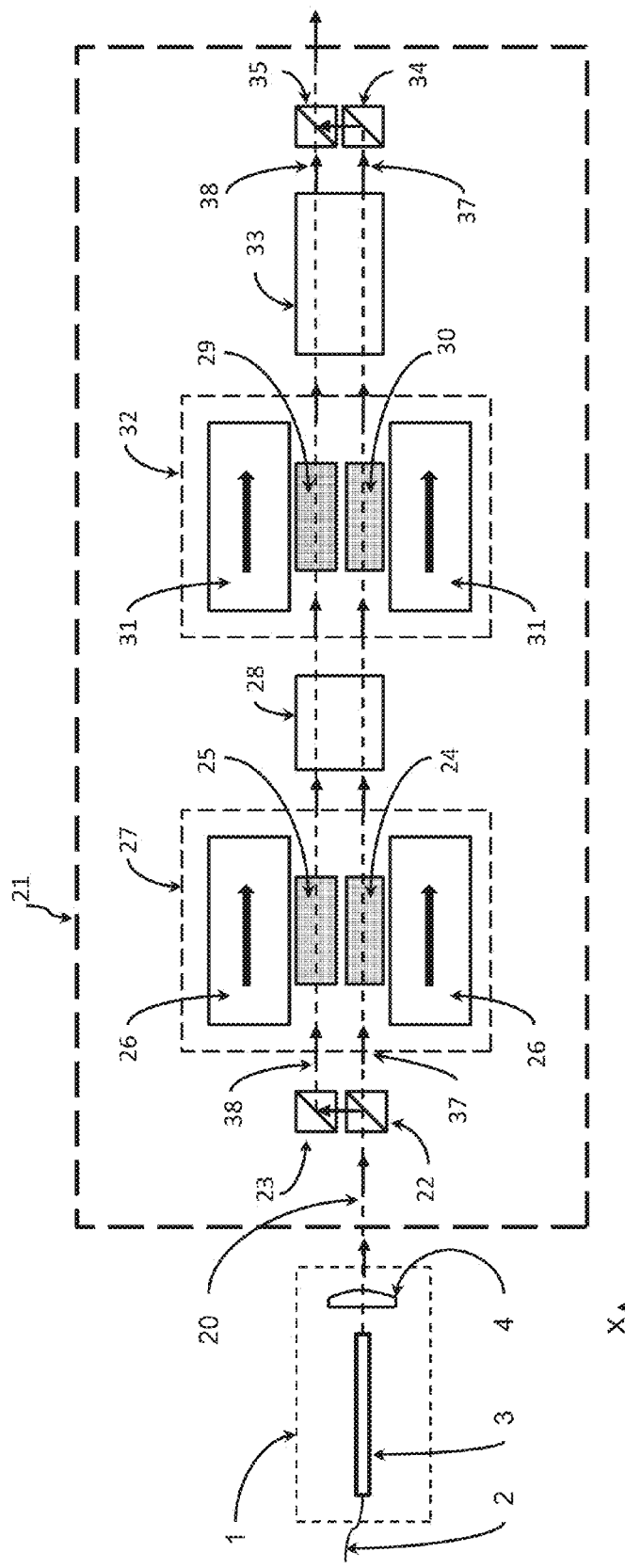
FIG. 3 is a schematic representation of a specific embodiment of the invention configured as a polarization insensitive (PI) optical isolator.

Referring to FIG. 3, there is illustrated elements of a high power broadband polarization independent (PI) optical 21 in accordance with the invention and with copending U.S. patent application Ser. No. 13/673,755, the content of which is incorporated herein by reference as found in Appendix A. Therein is a more detailed description of simultaneous, passive compensation of thermal birefringence and Faraday rotation dispersion that enables high power broadband optical isolation, which is particularly useful in conjunction with the thermal lens focal shift compensation of the present invention. The present discussion focuses upon the thermal lens focal shift compensation according to the present invention only. High power radiation, for example with central lasing wavelength $\lambda_c$ at 1080 nm, carried by optical fiber 2 is incorporated into fiber ferrule 3. Fiber ferrule 3 and collimating lens 4 together form fiber collimator 1 directing collimated high power radiation along axis 20 into high power broadband PI optical isolator 21. The beam radius will nominally be 150 µm exiting the ferrule 3 and approximately 300 µm when incident upon collimating lens 4. Therefore, ferrule 3, serving as an element of a beam width adjustment mechanism together with the collimating lens 4, requires a medium for the high beam fluence to safely exit the ferrule, such as an AR coated coreless fiber fused silica endcap as described in U.S. Pat. No. 7,306,376 "Monolithic Mode Stripping Fiber Ferrule/Collimator and Method of Making Same," For a 1 kW PM fiber laser, the peak fluence will be less than 3 MW/cm$^2$, well within the specified coating damage limit of ≥10 MW/cm$^2$ for high laser damage threshold coatings on fused silica such as are available from Precision Photonics Corp., Boulder, Colo. Orthogonally polarized beams 37 and 38 are formed from input beam 20 by means of broadband polarizing beamsplitters 22 and 23. Collimating lens 4, from which beam 20 emanates, is matched to the NA of fiber 2 to give a low power real beam waist radius of 150 µm in the approximate center of two 8 mm-long TGG Faraday optics 29 and 30 within second 22.5° Faraday rotator 32. The first 22.5° Faraday rotator 27, containing two TGG Faraday optics 24 and 25, serves as the (first) thermal lens required for negative feedback for focal shift compensation. Optical rotators 28 and 33 respectively at the outputs of the first and second Faraday rotators 27 and 32 provide the required rotation for compensation of thermal birefringence and Faraday rotation dispersion. Small broadband polarizing beamsplitter cubes 22, 23 at the first rotator input, and 34 and 35 at the second rotator output for recombination, are used in order to keep the beam separation between orthogonally polarized beams 37 and 38 minimal. The small beam separation is important to minimize polarization astigmatism that might otherwise arise by having the collimated beam waists of beam paths 37 and 38 at significantly different positions along the length of Faraday optics 30 and 29 respectively.

Figure 4A:
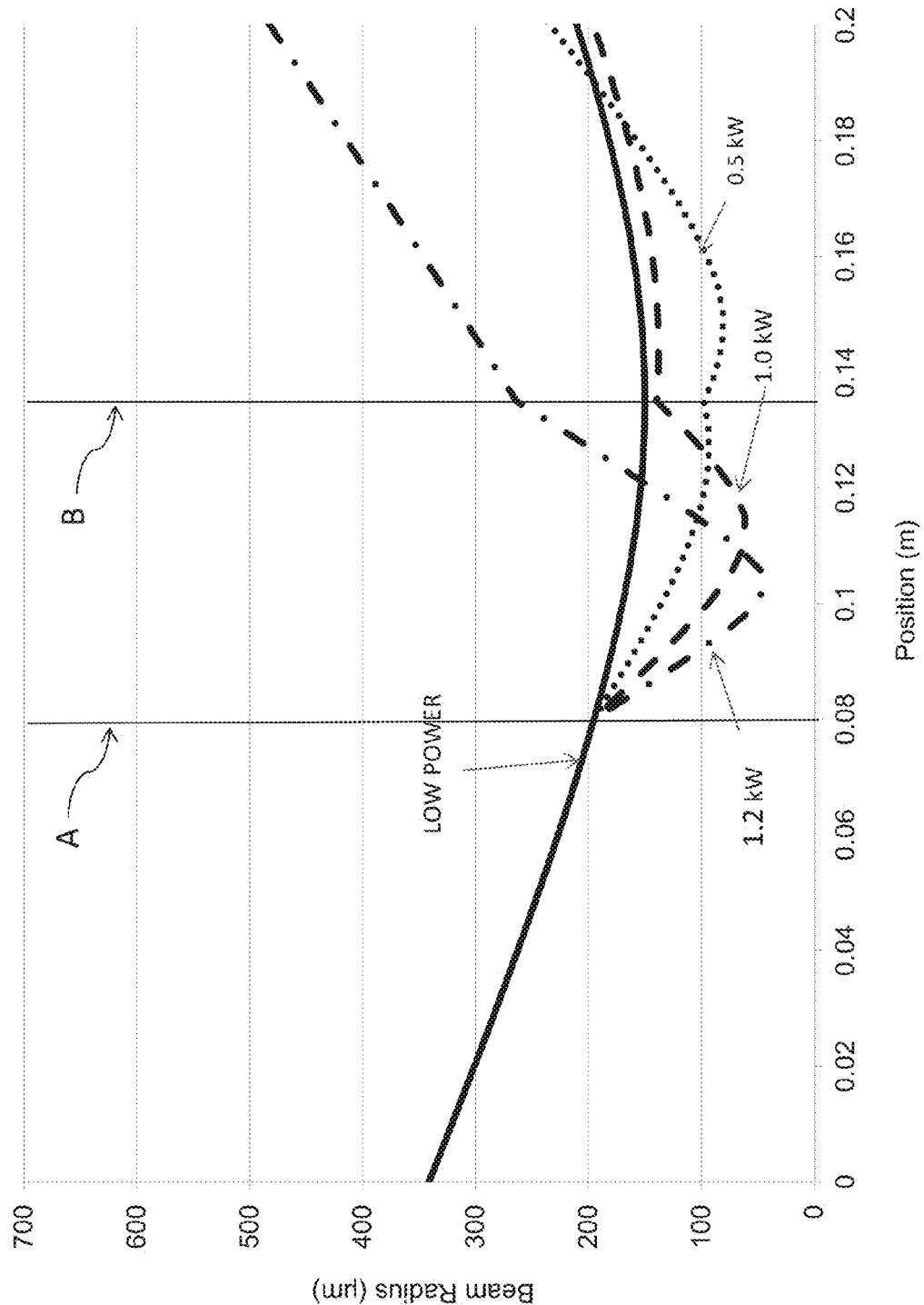
FIG. 4a is a graph showing plots of beam diameters within the PI optical isolator of FIG. 3 and focal shift of such a system expressed in terms of number of Rayleigh ranges of the focused beam.
Figure 4B:
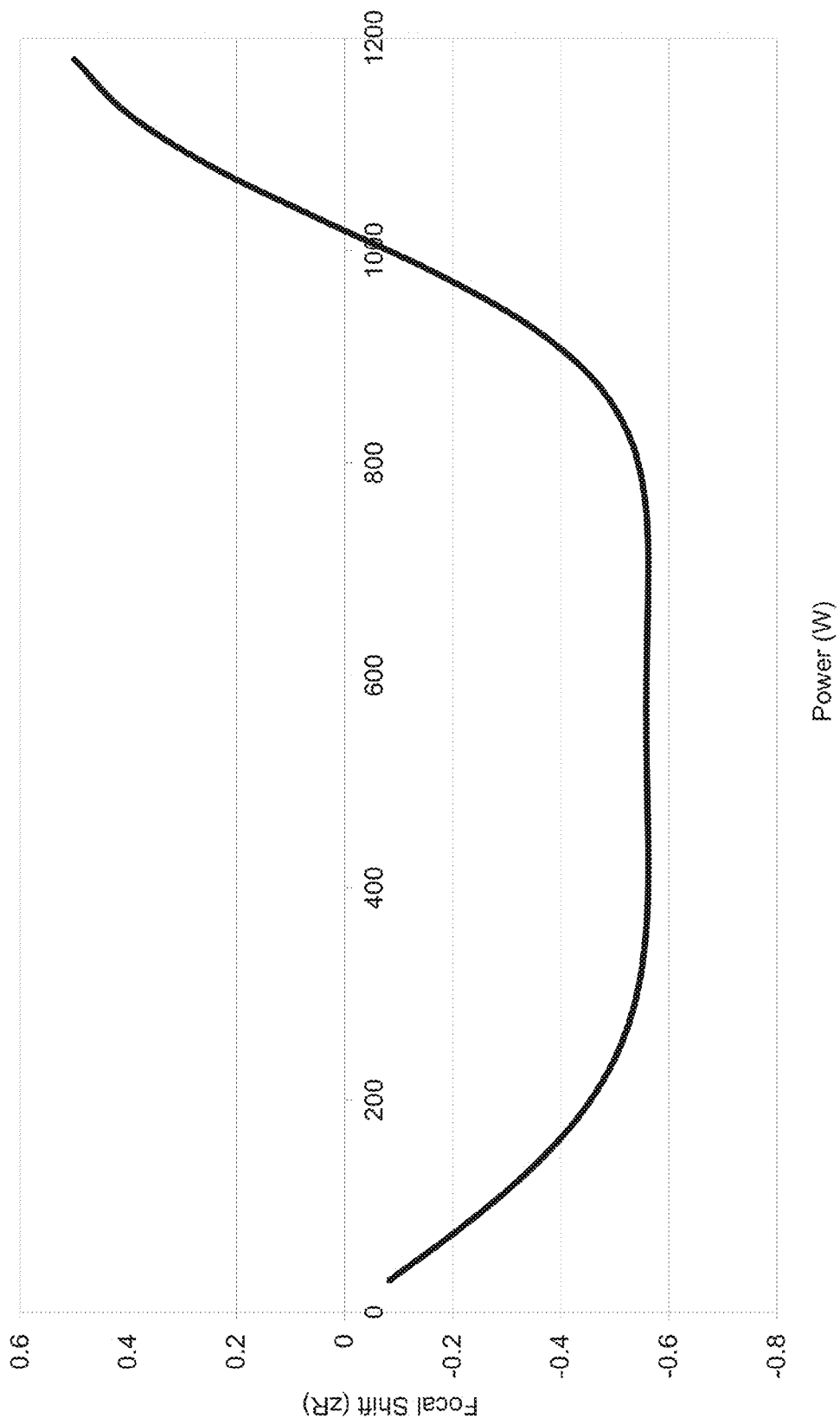
FIG. 4b is a graph illustrating focal shift vs. power.

FIG. 4a depicts beam diameters at different positions through the isolator 21 at different power levels. The low power beam plot shows the initial waist radius of 150 μm centered at the second Faraday rotator position B. The 0.5 kW beam, 1.0 kW beam, and 1.2 kW beam show the changing beam parameters as power increases and causes thermal lensing at Faraday rotator positions A and B. FIG. 4b shows the relative focal shift $\Delta Z_{TL}/Z_R$ over changing power levels out of the system shown in FIG. 1 using a Faraday isolator with focal shift compensation. As power levels are increased, there is a small negative relative focal shift before the focus position stabilizes and remains constant across a large range of power levels. Eventually the focus returns to its original position and becomes positive. The power level at which the focus returns to its original position can be increased by reducing the separation between the first and second Faraday rotators, or the power level can be decreased by increasing the separation. In comparison, a typical Faraday rotator of the prior art using large beams would see a focal shift of $5.6 Z_R$ at the 1 kW power level, nearly an order of magnitude greater than the maximum focal shift created by the current invention!

Figure 5B:
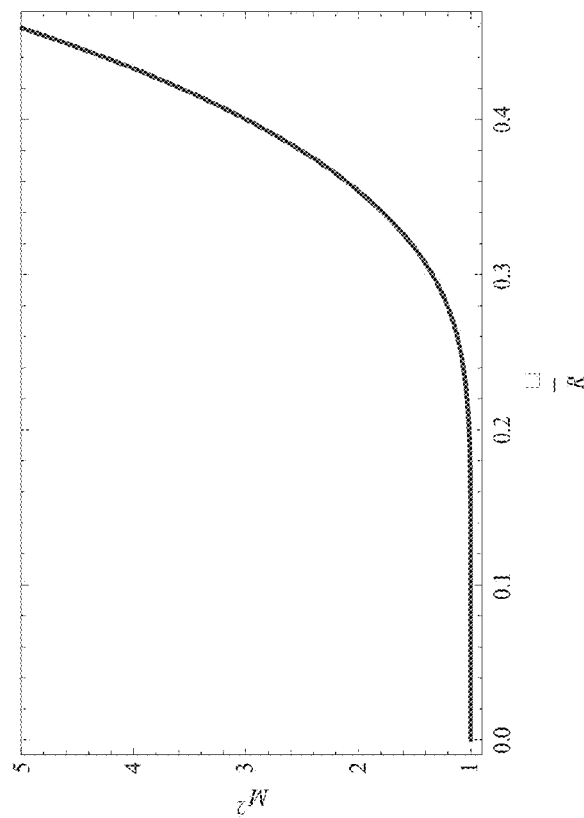
FIG. 5b is a graph showing beam degradation due to aberration (spherical) as a function of beam size in accordance with the invention.
Figure 5A:
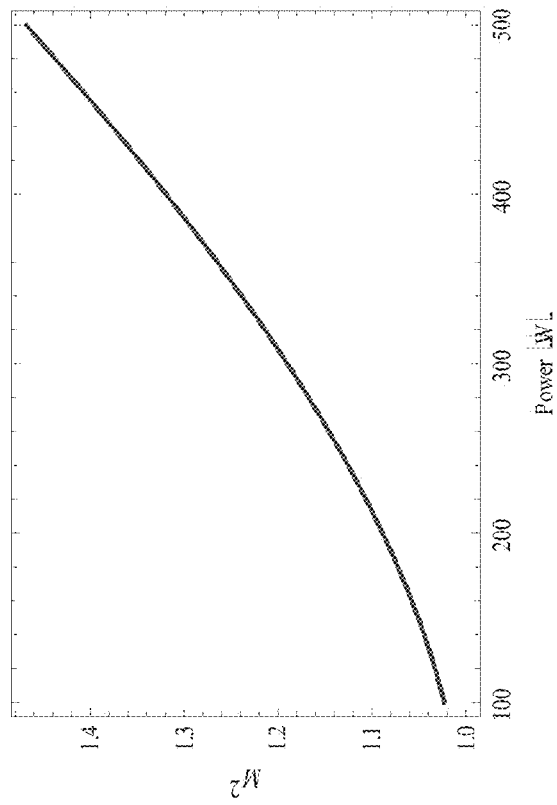
FIG. 5a is a graph showing beam degradation due to aberration (spherical) as a function of power in accordance with the invention.

Importantly, according to another aspect of the invention, spherical aberration of the thermal lens is reduced at high power levels by using small beams in accordance with the invention, as shown in FIGS. 5a and 5b. FIG. 5a shows the degradation in $M^2$ of a diffraction limited beam passing through an 8 mm long TGG crystal with a diameter four times the beam diameter. The plot shows the loss of diffraction-limited behavior with increasing in thermal lensing as a result of increased power. FIG. 5b shows the $M^2$ degradation of a 200 W diffraction limited beam passing through an 8 mm a long TGG crystal as a function of the ratio of beam radius to optic radius. Typically, optic elements are chosen to be twice the size of the beam used. This keeps optics smaller while still avoiding clipping of the Gaussian cross-sectional profile. As can be seen, even at the limited power level of 200 W, a ratio of 0.5 results in an extreme degradation of $M^2$. At lower ratios, $M^2$ degradation is significantly reduced and diffraction-limited behavior can be maintained at high power levels. In accordance with the invention, the Faraday rotator elements are sized with low enough ratios to maintain near-diffraction-limited behavior at 1 kW power levels.

Figure 6:
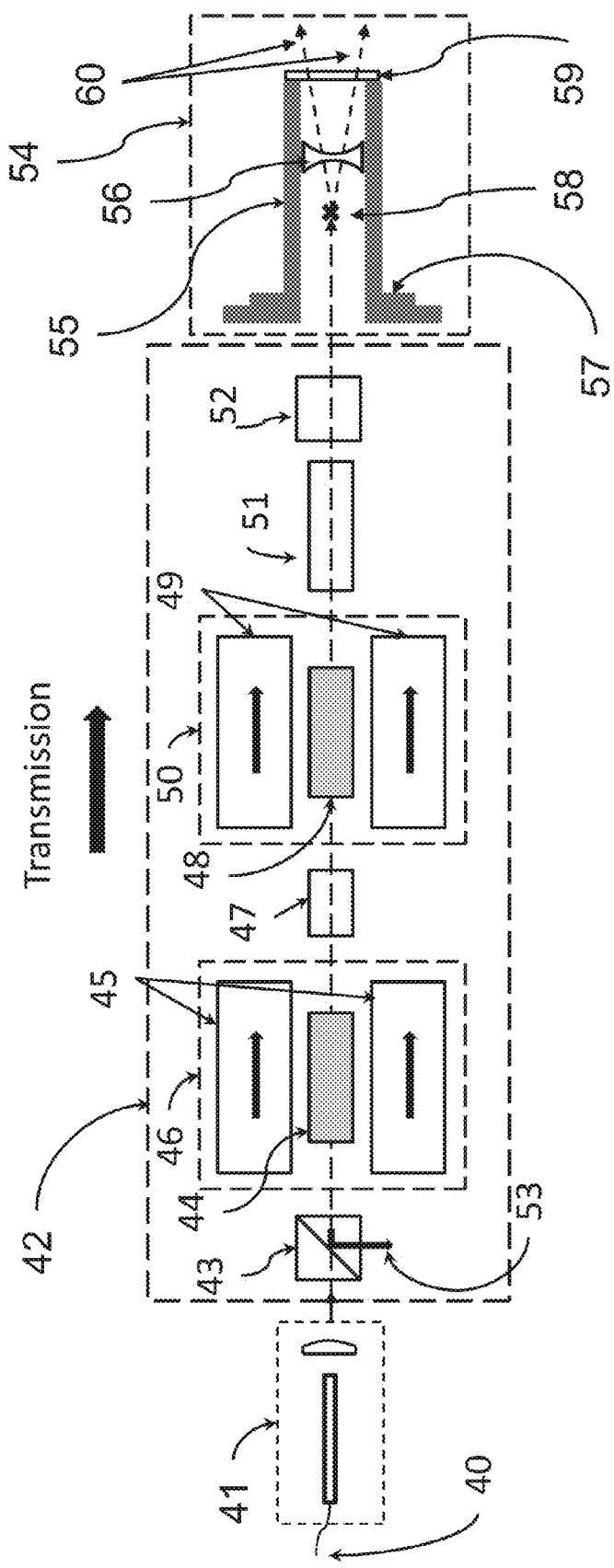
FIG. 6 is a schematic representation of a specific embodiment of the invention configured as a polarization maintaining (PM) optical isolator.

Referring to FIG. 6 there is shown a high power broadband PM-type optical isolator 42 in accordance with a specific embodiment of the invention, together with high power (male) connector 54. High power radiation, for example at 1080 nm from a single mode PM fiber laser, is carried on either a PM or polarizing fiber 40 into fiber collimator 41. Fiber collimator 41 is preferably a monolithic mode-stripping fiber collimator with a coreless fiber endcap in accordance with U.S. Pat. No. 7,306,376. In this PM version, fiber collimator 41 is designed to have a beam waist at the center of 8 mm TGG Faraday optic 48 within a second 22.5° Faraday rotator 50. The beam diameters and aberrations for the PM isolator of FIG. 6 are comparable to those of the PI isolator of FIG. 3 as depicted in FIGS. 4a, 4b, 5a and 5b, respectively after accounting for the power split between paths 37 and 38 in the PI isolator. Input polarizer 43 is matched to polarization axis of a PM or polarizing input fiber 40 and functions to remove any significant elliptical polarization component to form a substantially linear polarization into a first Faraday rotator 46. The specific details and functions of high power broadband optical isolator elements, namely Faraday optics 44 and 48, magnets 45 and 49, optical rotators 47 and 51 and high power broadband polarizing beamsplitter cubes 43 and 52 are described in more depth in relation to FIG. 1 in U.S. patent application Ser. No. 13/673,755. High power male connector 54 is a convenient way to deliver high power radiation out of high power PM broadband isolator 42 in a large, divergent beam 60 with consistent properties for mating with female connectors, beam delivery heads and other components commonly used with high power industrial laser systems. A negative lens 56 is chosen to give the desired divergent beam 60 and is positioned along the z axis of male connector body 55 to consistently locate a virtual source waist 58 at a precise distance along the z axis from connector reference shoulder 57. Configured in this manner, the divergent output beam 60 transmitted through anti-reflection coated window 59 always has consistent output with a well-defined virtual source location and divergence when mating connectors and components are properly engaged against male connector reference shoulder 57. Male connector 54 also provides a convenient means for sealing high power PM broadband isolator 42 against ingress from contaminants that can dramatically reduce the damage threshold of optical elements within the optical isolator.

Figure 7:
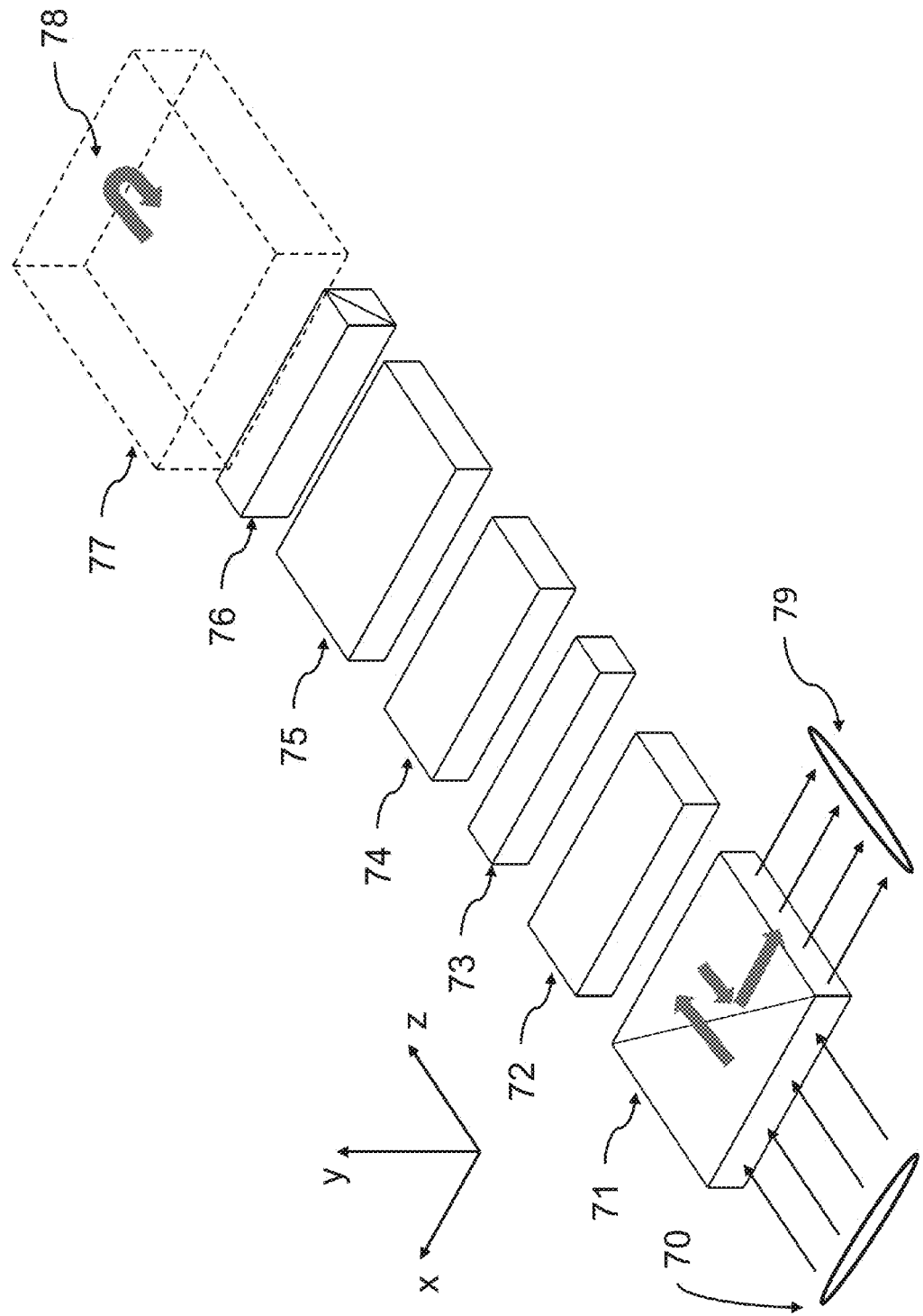
FIG. 7 is a perspective view of a double pass power amplifier used in conjunction with elliptical beams and a slab geometry high power PM broadband optical isolator in accordance with the invention.

FIG. 7 is a perspective view of a slab geometry high power PM broadband optical isolator 65 used with elliptical or rectangular beams and a double pass amplifier 77 (shown in phantom). Input elliptical cross section beam 70 may be, for example, from a slab geometry solid state laser or a conditioned linear array of fiber laser sources to be amplified to higher power in amplifier 77. The dashed lines denote a "black box" double pass amplifier with reflective surface 78 and internal imaging optics to ensure that the input elliptical beam 70 is reflected back through the slab geometry PM optical isolator with the same beam properties as the transmitted beam. After the input beam 70 is transmitted through the optical isolator and reflected from reflective surface 78, it is rejected as output elliptical beam 79 at slab shaped input polarizer 71 in the −x direction as shown. The high power PM broadband optical isolator 65 of FIG. 7 is essentially identical to the high power PM broadband optical isolator 42 of FIG. 6 with the exception that the optical elements have high aspect ratio rectangular clear apertures. Slab shaped Faraday optics 72 and 74 are shown. (Surrounding magnets are not shown to keep the drawing uncluttered.) A 67.5° quartz rotator 73 and 112.5° quartz rotator 75 as well as broadband polarizers 71 and 76 all have the same function in the isolator 65 (FIG. 7) as described previously in the isolator 42 (FIG. 6).

Figure 8:
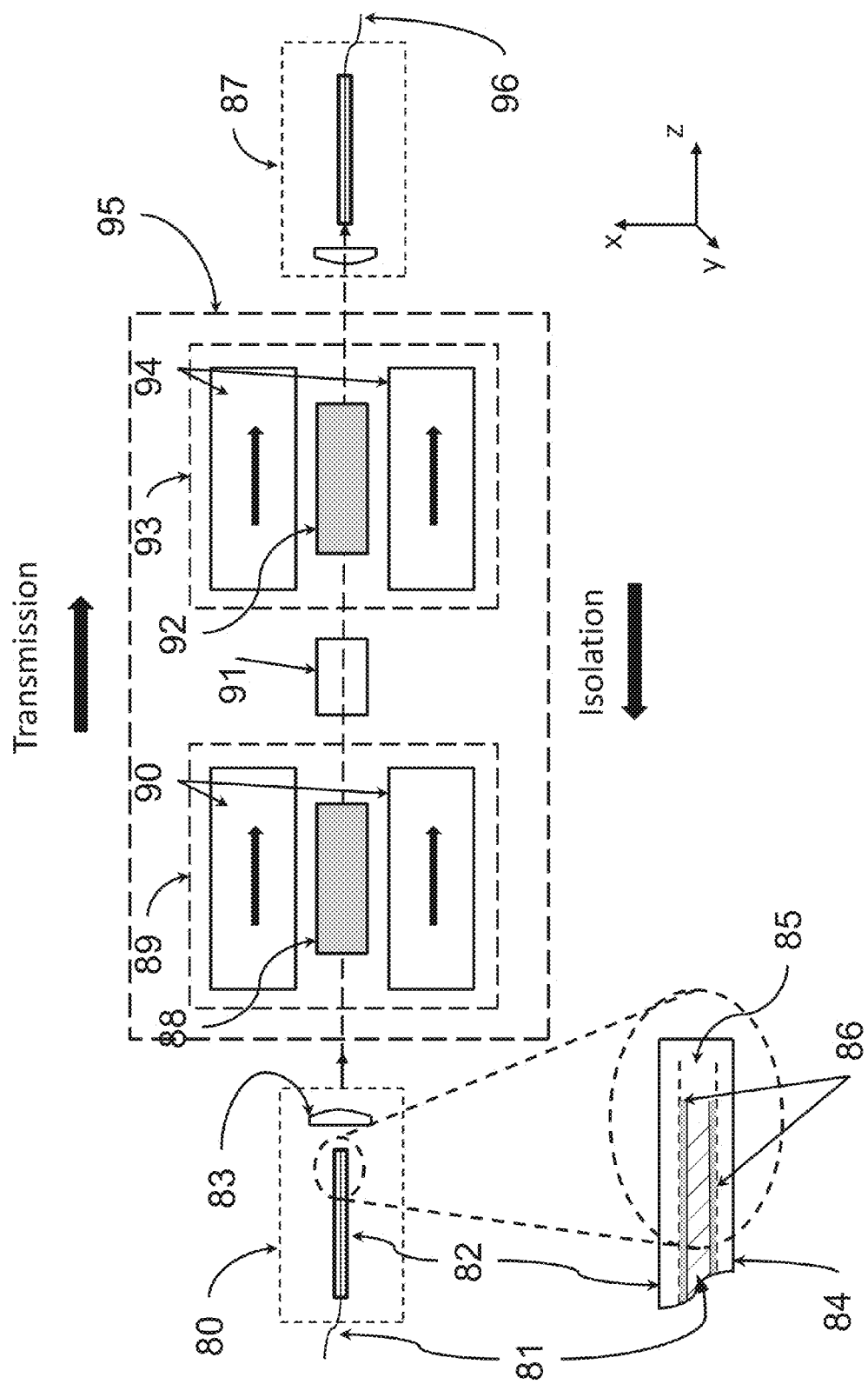
FIG. 8 is a schematic representation of a high power PM fiber to fiber optical isolator in accordance with the invention.

The low thermal lens focal shift of the invention make possible high power fiber-to-fiber optical isolators. FIG. 8 is a cross sectional diagram of a high power PM fiber-to-fiber optical isolator 95 in accordance with the invention. High power PM optical isolator 95 is functionally similar to the PM optical isolator 42 of FIG. 6, with the exception that a 112.5° quartz rotator such as 51 in FIG. 6, required for high power broad spectral bandwidth optical isolation (in accordance with U.S. patent application Ser. No. 13/673,755) has been removed in this example. Hence, the high power PM optical isolator 95 of FIG. 8 is best suited for narrow spectral bandwidth high power lasers such as polarized Yb fiber lasers. However, if broad spectral bandwidth is required, the high power PM fiber-to-fiber optical isolator 95 of FIG. 8 can be readily enhanced for such operation with the addition of a 112.5° quartz rotator such as element 51 in FIG. 6.

The high power PM optical isolator of FIG. 8 also replaces polarizing beamsplitter cubes (such as 43 and 52 in FIG. 6) with functionally equivalent polarizing fibers 81 and 96. Polarizing fiber transmits only a single polarization for the wavelength region used. Examples are Fibercore "ZING" fiber and tilted fiber Bragg grating fiber ("TFBG fiber"). All polarizing fibers remove the undesired polarization through the fiber cladding. Fibercore "ZING" fiber does this in a distributed fashion with the length of the fiber largely determining the extinction ratio of the polarizing fiber. Approximately 1 m of Fibercore "ZING" fiber is required to guarantee 30 dB operation. In contrast TFBG fiber achieves extinction ratios on the order of 30 dB by writing short (approximately 5 cm) "polarizing region" lengths of periodic refractive index changes that are tilted relative to the fiber as shown in the oval expanded section of FIG. 8. The rejected polarization is diffracted away from the fiber core through the cladding in the polarizing region. For this reason, TFBG fiber polarizers are desirable for high power fiber-to-fiber optical isolators in accordance with the present invention because the polarizing region can be fully encapsulated in a mode stripping ferrule such as, for example, U.S. Pat. No. 7,306,376 to ensure that any rejected polarization is safely mode-stripped within the mode stripping fiber ferrule rather than potentially burning the fiber coating. FIG. 8 shows the tilted TFBG fibers 81 fused within monolithic mode stripping fused silica ferrule assembly 82. As shown in the expanded oval section of FIG. 8, in accordance with U.S. Pat. No. 7,306,376, monolithic mode stripping fused silica ferrule assembly 82 is comprised of polarizing TFBG fiber 81 fusion spliced to larger diameter cureless endcap fiber 85 which is then fused to fused silica ferrule 84 to form a monolithic ferrule structure. The region between the polarizing fiber 81 and ferrule 84 is filled with modestripping powder and fused to scatter cladding mode radiation out of the ferrule assembly 82. Although polarizing TFBG fiber can be written with UV radiation in UV sensitive fiber, high temperatures, such as those commonly used to fuse modestripping powder in the ferrule 82 readily erase such gratings. For this reason, tilted Bragg gratings are preferentially written with femtosecond lasers to impart permanent refractive index changes in the fiber when used with high power lasers and modestripping ferrules such as disclosed in U.S. Pat. No. 7,306,376.

In accordance with this embodiment of the invention, polarizing fibers 81 and 96 are rotated about the z axis as required. In the transmission +z direction Faraday rotators 89 and 93 of FIG. 8 each rotate the input polarization from fiber collimator 80 a negative 22.5°, whereas quartz rotator 91 rotates polarization a positive 67.5°. To account for the net positive 22.5° polarization rotation in transmission, the transmission polarization axis of polarizing fiber 96 within fiber collimator 87 must also be aligned to this −22.5° angle about the z axis in order to ensure proper alignment.

For high average power applications, significant power can be scattered from the mode stripping ferrules within fiber collimators 80 and 87. This may be due to either rejected polarization radiation or uncoupled radiation that has missed the core of polarizing fibers 81 and 96. Since this power may be significant (such as for example if tight from output fiber 96 is directed onto a highly reflective surface), it is preferable to either water cool the mode stripping ferrules within fiber collimator directly or to surround them with an absorbing encasement which is water cooled.

For narrow-band operation, a half-waveplate may replace quartz rotator 91, albeit with reduced birefringence compensation at high power as described previously.

Figure 9:
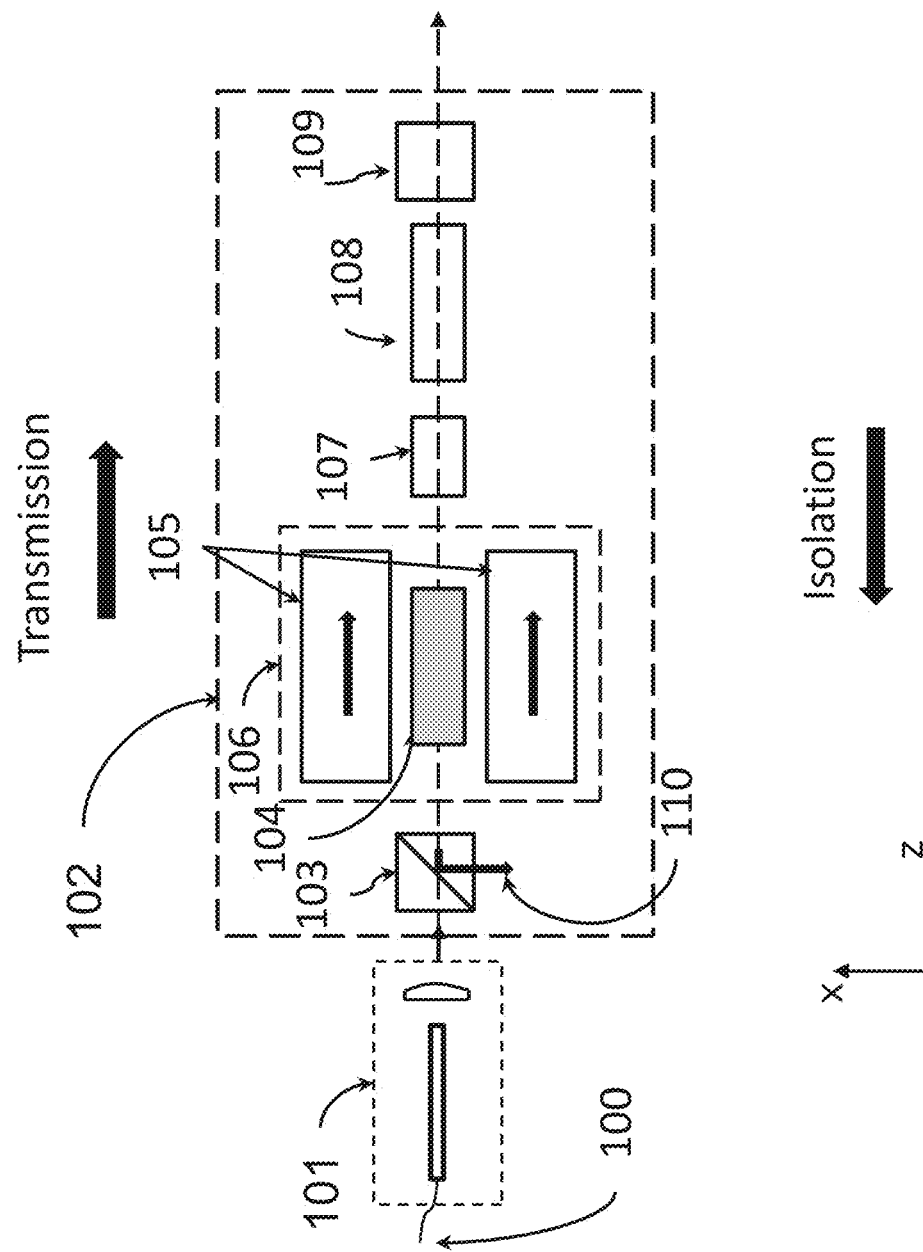
FIG. 9 is a schematic representation of a high power PM optical isolator employing a single Faraday rotator and an additional optical element in accordance with the invention.

Referring to FIG. 9, an optical isolator 102 device is illustrated where PM fiber 100 and fiber collimator 101 provide the same function as PM fiber 40 and fiber collimator 41 in FIG. 6. Fiber collimator 101 is designed to have a beam waist at the center of optical element 108. Optical element 108 has similar absorption and thermal properties to faraday optic 104 in 45° Faraday rotator 106 or can be of the same material. Optical element 108 and 45° Faraday rotator 106 thus create a negative feedback system used to compensate focal shift in accordance with a specific embodiment of the invention. High power broadband polarizing beamsplitter cubes 103 and 109 are provided like the high power broadband polarizing beamsplitter cubes 43 and 52 in FIG. 6. 45° degree quartz rotator 107 provides opposite handedness rotation in the reverse direction as 45° Faraday rotator 106 to create broadband isolation due to similar rotation dispersion. Positions of Faraday rotator 106 and optical element 108 can be interchanged if desired.

For purposes of incorporation, attached as APPENDIX A are excerpts from the Summary and Detailed Description of co-pending U.S. patent application Ser. No. 13/673,755 filed Nov. 9, 2012, referenced herein.

The invention has now been explained with reference to specific embodiments. Other embodiments will be evident to those of skill in the art. It is therefore not intended that the invention be limited, except as indicated by the appended claims.

What is claimed is:

1. An apparatus forming an optical isolator system having an optical input and an optical output, the apparatus comprising optical components including:
   a first Faraday rotator for receiving and rotating a high power laser beam from the optical input and operative as a positive thermal lens; and
   a second Faraday rotator for receiving and rotating the high power laser beam from the first Faraday rotator, said second Faraday rotator also operative as a positive thermal lens;
   a beam adjuster wherein beam waist size and beam waist location of the high power laser beam directed through both of the Faraday rotators are adjusted such that diffraction effects of the laser beam at small beam diameters and thermal lens effects in the Faraday rotators at high beam power generate a negative feedback in order to reduce focal shift at the optical output.

2. The apparatus according to claim 1 wherein said optical components are disposed in the path of the high power laser beam and are sized such that the ratio of beam size to optical diameter of said optical components is small to allow for diffraction-limited behavior at high power.

3. The apparatus according to claim 1 wherein said first and second Faraday rotators have rectilinear slab shaped optical geometries and wherein the laser beam is elliptical.

4. The apparatus according to claim 1 wherein a fiber collimator comprises the optical input and the beam adjuster.

5. The apparatus according to claim 1 wherein the optical input and the optical output are fiber collimators.

6. The apparatus according to claim 5 wherein at least one of the fiber collimators is constructed of a polarizing fiber.

7. The apparatus according to claim 1 wherein the first Faraday rotator and the second Faraday rotator are formed of gallium arsenide (GaAs).

8. An apparatus forming an optical isolator system having an optical input and an optical output, the apparatus comprising optical components including:

a first Faraday rotator for receiving and rotating a high power laser beam from the optical input and operative as a thermal lens; and a second Faraday rotator for receiving and rotating the high power laser beam from the first Faraday rotator;

a beam adjuster wherein beam waist size and beam waist location of the high power laser beam directed through both of the Faraday rotators are adjusted such that diffraction effects of the laser beam at small beam diameters and thermal lens effects in the Faraday rotators at high beam power generate a negative feedback in order to reduce focal shift at the optical output, wherein the optical isolator is polarization insensitive.

9. The apparatus according to claim 8 wherein the first Faraday rotator and the second Faraday rotator are formed of terbium gallium garnet (TGG).

10. An apparatus forming an optical isolator system having an optical input and an optical output, the apparatus comprising optical components including:

a first beam splitter pair disposed at the optical input operative to split an input beam into a first subbeam of a first polarization;

a second parallel subbeam of a second polarization different from the first polarization;

a first Faraday rotator for receiving and rotating a high power laser beam formed of the first subbeam from the optical input and operative as a thermal lens; and a second Faraday rotator for receiving and rotating a high power laser beam formed of the second subbeam from the optical input and operative as a thermal lens and disposed parallel and adjacent to the first Faraday rotator;

a third Faraday rotator for receiving and rotating the high power laser beam from the first Faraday rotator;

a fourth Faraday rotator for receiving and rotating the high power laser beam from the second Faraday rotator and disposed parallel and adjacent to the third Faraday rotator;

a second beam splitter pair disposed at the optical output and operative to recombine the first subbeam and the second subbeam; and a beam waist adjuster wherein waist size and waist location of the high power laser beam directed through the Faraday rotators are adjusted such that diffraction effects of the laser beam at small beam diameters and thermal lens effects in the Faraday rotators at high beam power generate a negative feedback in order to reduce focal shift at the optical output, and wherein the optical isolator is polarization insensitive.

11. The apparatus according to claim 10 wherein the first Faraday rotator and the second Faraday rotator are formed of terbium gallium garnet (TGG).

12. The apparatus according to claim 10 wherein the first Faraday rotator and the second Faraday rotator are formed of gallium arsenide (GaAs).

13. An apparatus forming an optical isolator system having an optical input and an optical output, the apparatus comprising optical components including:

a single Faraday rotator;

an optical element with thermal properties similar to said single Faraday rotator and disposed along a beam path at an input to the single Faraday rotator;

a component for setting beam waist size and beam waist location of a high power beam directed through the apparatus such that diffraction effects and thermal lens effects at high power generate negative feedback that results in a substantial reduction of focal shift at the optical output of the apparatus.

14. The apparatus according to claim 13 wherein the first Faraday rotator and the second Faraday rotator are formed of terbium gallium garnet (TGG).

15. The apparatus according to claim 13 wherein the first Faraday rotator and the second Faraday rotator are formed of gallium arsenide (GaAs).

* * * * *